United States Patent [19]

Louis et al.

[11] Patent Number: 4,964,038
[45] Date of Patent: Oct. 16, 1990

[54] DATA PROCESSING SYSTEM HAVING AUTOMATIC ADDRESS ALLOCATION ARRANGEMENTS FOR ADDRESSING INTERFACE CARDS

[75] Inventors: Philippe P. R. Louis; Gerard M. Montanari, both of Cagnes-sur-Mer; Robert L. Leotard, Vence, all of France

[73] Assignee: International Business Machines Corp., Armonk, N.Y.

[21] Appl. No.: 113,310

[22] Filed: Oct. 28, 1987

[51] Int. Cl.[5] .............................................. G06F 3/00
[52] U.S. Cl. .................................................... 364/200
[58] Field of Search ............................... 364/200, 900

[56] References Cited

U.S. PATENT DOCUMENTS

| | | | |
|---|---|---|---|
| 4,556,953 | 12/1985 | Caprio et al. | 364/900 |
| 4,660,141 | 4/1987 | Ceccon et al. | 364/200 |
| 4,670,855 | 6/1987 | Caprio et al. | 364/900 |

FOREIGN PATENT DOCUMENTS

| | | |
|---|---|---|
| 0068569 | 1/1983 | European Pat. Off. . |
| 0074865 | 3/1983 | European Pat. Off. . |
| 0087367 | 8/1983 | European Pat. Off. . |
| 2060961 | 5/1981 | United Kingdom . |
| 2172779 | 9/1986 | United Kingdom . |

*Primary Examiner*—Raulfe B. Zache

[57] ABSTRACT

A data processing system in which any one of a plurality of different or similar interface circuit cards can be located into any one of a number of slots of the data processing system without preassignment. The system includes a master processor which communicates with the interface cards through a data bus, address bus and control bus. Each interface card includes decoding means which computes during an initialization sequence a random address which will be used to decode the address bus after the initialization sequence. Once the different cards have their specific addresses, the system can reassign a new address according to the identifier register and the nature of the card thereby allowing the application programs to address each card separately and irrespective of the prior random address. This system may be used in small computers like the personal computer which are not designed with any slot identifier device.

18 Claims, 4 Drawing Sheets

DATA PROCESSING SYSTEM HAVING AUTOMATIC ADDRESS ALLOCATION ARRANGEMENTS FOR ADDRESSING INTERFACE CARDS

BACKGROUND

The present invention relates to data processing sytems and more particularly to apparatus for simplifying the expansion of such systems.

Configuring computer systems to individual needs or desires, by adding system peripheral modules such as video display devices, floppy disk data storage devices, printer communication facilities, telephone management systems and the like is often done.

The addition of new capabilities to the computer system requires the plugging of interface circuit cards into the available slots of the computer board. However, after each module addition or subtraction, the control processor must be able to address separately every interface card plugged on the board. The problem of address allocation has been known for many years, and different solutions have been worked out.

With respect to a first solution in the prior art, each interface circuit card has resident decoding circuity so that when the control processor wants to communicate with a card, the interface circuit can be addressed, irrespective of its physical location among the slots. That device is disclosed in FIG. 1. The control processor generates the address through address bus 106 on which adapter card 105 is connected. That adapter is personalized by switches or straps 101 to 103 and others. Comparator 104 enables the selection of the card by lead 107 if the two addresses coincide. The main drawback is that manual intervention is required at installation time which may lead to configuration errors. This also involves more detailed customer documentation booklets and entails complex maintenance operations. This solution also prevents the user of a computer system from plugging two similar cards which do not have a resident decoding circuitry. In the personal computer, for instance, since no strap or switch exists on the SDLC (Serial Data Link Controller) adapter, the latter has a unique address and therefore only one card of this type can be plugged.

A second solution in the prior art which does not require manual intervention at installation time is based on the same principle apart from the fact that the switches or straps are located on the board. The different addresses are determined by decoding a bit configuration specific to each slot. That feature, even though avoiding manual intervention, entails new disadvantages. Since the address must be provided by the physical slot of the board, the computer board must obviously be designed to provide this information and thus rule out any small computer system like the personal computer from that capability. In addition, that solution does not allow any longer the possibility of plugging one interface card in a slot irrespective of its physical location on the board and prevents the plugging of two identical cards which have no specific decoding means (for instance two memory extension cards).

The circuitry which effects a serial scanning of the "ordered" slots has, in the prior art, been some form of "daisy chain" configuration. By using a signal which is chained through all adapters, it becomes possible to let each adapter communicate successively with the main processor and assign different addresses. FIG. 2 illustrates that principle. A daisy chain signal on lead 203 goes through adapter card 200 which can then give the priority to the next adapter card 201 and so on. The card does not need a specific manipulation at installation time and can be plugged in any of the slots. However, such configuration requires that there be no empty or vacant slots and that the base machine is designed to provide the priority information. The board needs a particular signal with an input and an output on each slot only involved during the initialization period of the addressing.

U.S. Pat. No. 4,556,953 "Interchangeable interface circuitry arrangements for use with a data processing system" by A. Ronald Caprio et al, discloses an arrangement whereby any one of a plurality of different or similar interface circuit cards can be located into any one of a number of slots without preassignment. This device implies that the base machine is designed to provide such function. Particularly, it requires an extra lead for transmitting a signal which indicates that there is an option card present at the particular physical location in which the card is inserted. Thus, that feature cannot be used on a small system such as the personal computer.

SUMMARY OF THE INVENTION

The present invention eliminates the necessity of manual intervention on the board or on the interface card, decreases the complexity of maintenance and allows cost reduction.

The present invention allows the plugging of one or several cards, similar or different in the slots available irrespective of their location on the board.

The present invention eliminates the ordering of interface circuit cards in particular slots, to accommodate a priority determination plan and permits vacant slots to exist between active interface cards.

The invention provides the above capabilities for computer systems having common buses, a priori not designed to allow those functions, such as small systems like the personal computer.

The invention is the fulfillment of a philosophy that would permit users of computer systems to plug a new card in a slot available irrespective of its position on the board and irrespective of the existence and the nature of the other interface cards also plugged.

DETAILED DESCRIPTION OF THE PREFERRED EMBODIMENT

Figure 1:
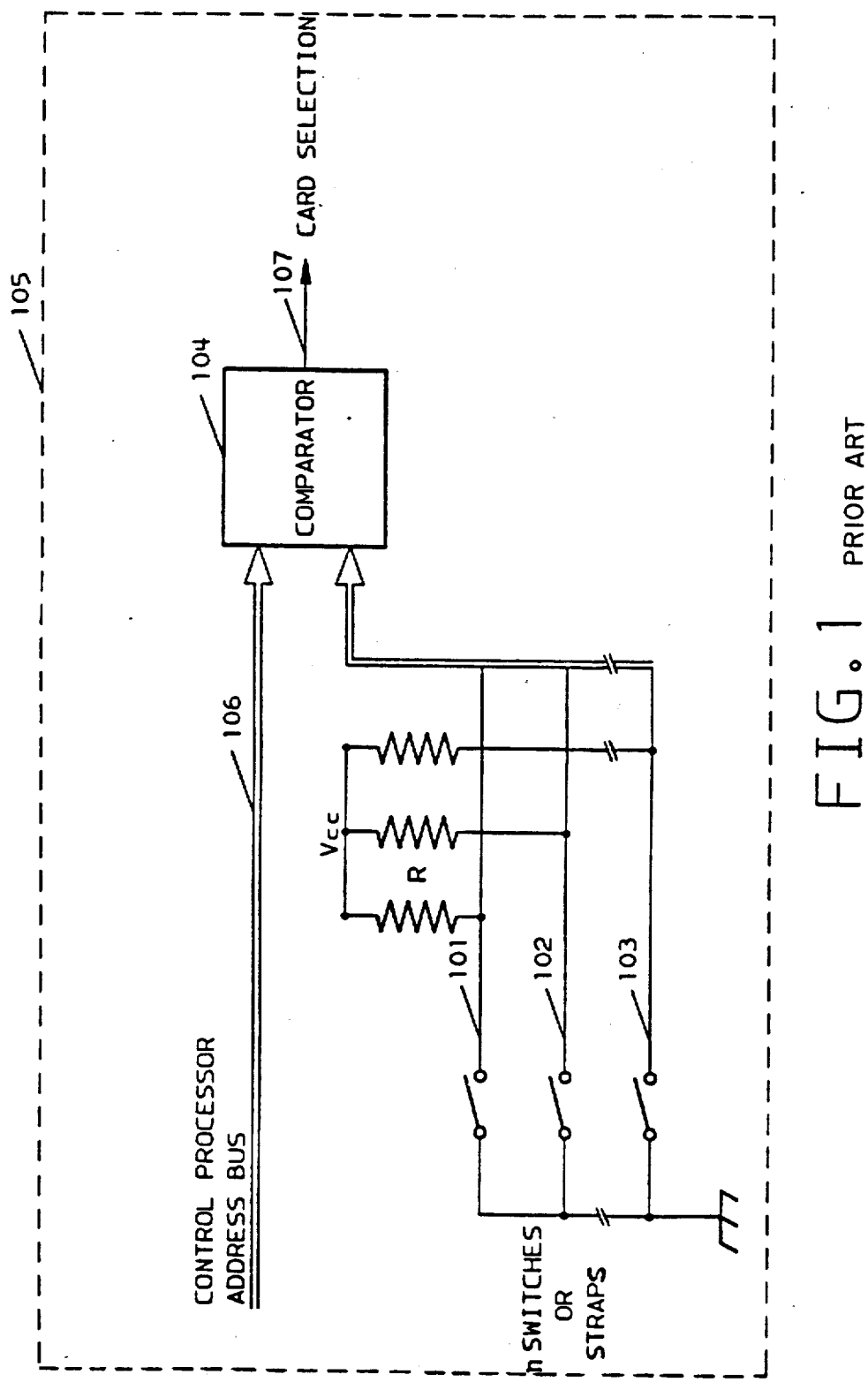
FIG. 1 is a schematic block diagram of the prior art.
Figure 2:
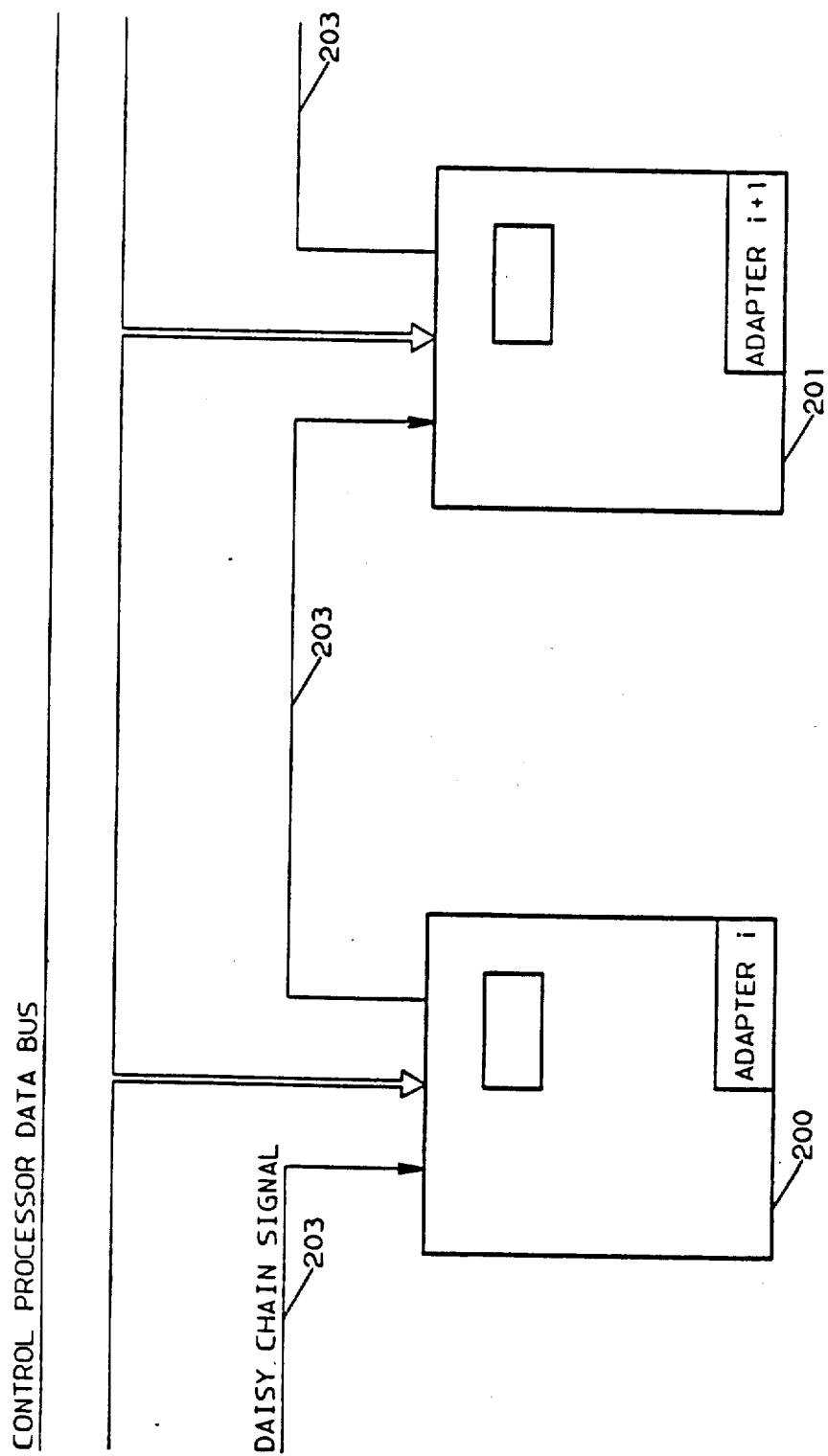
FIG. 2 is a schematic block diagram of the prior art.
Figure 3:
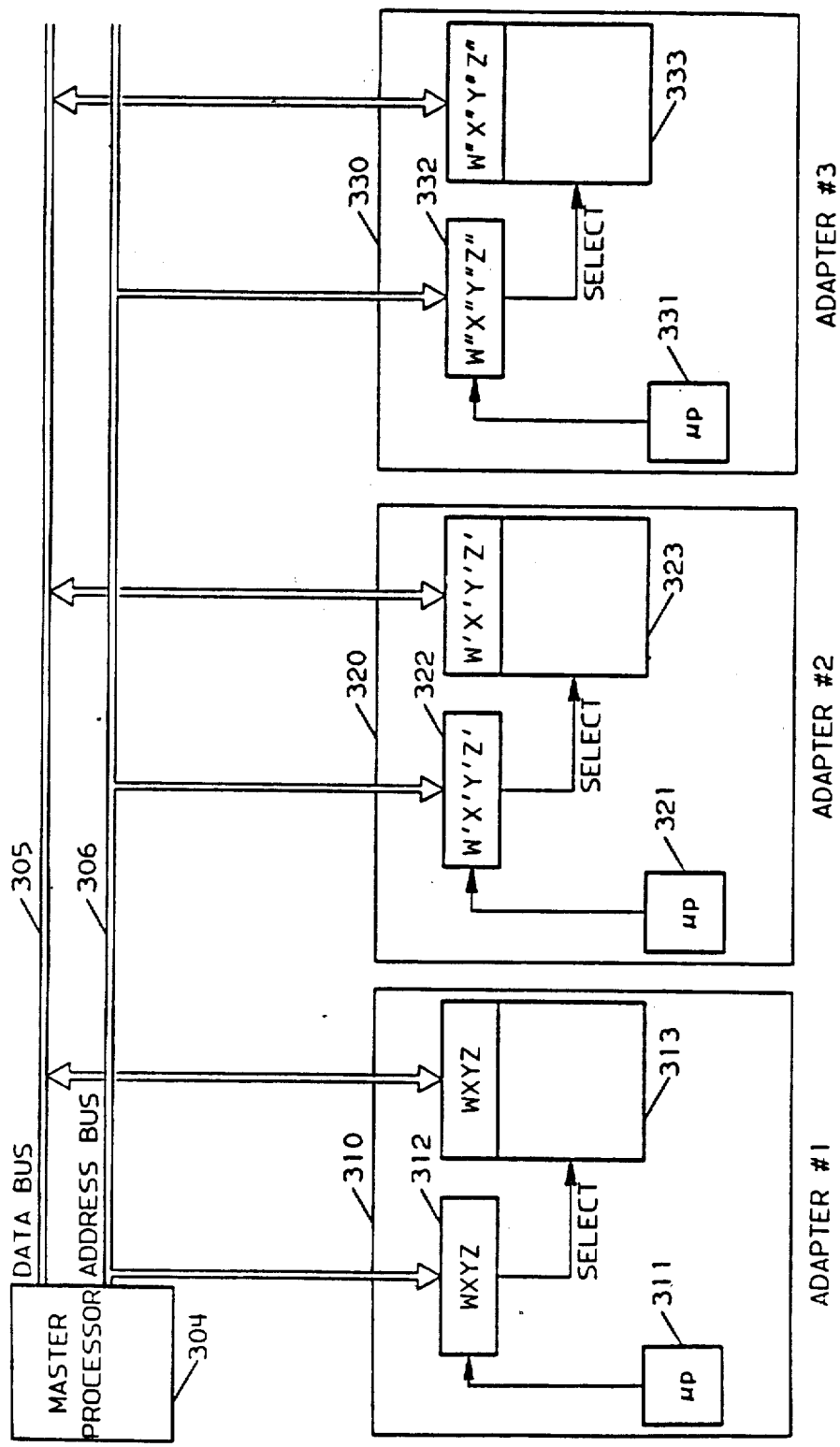
FIG. 3 is a schematic block diagram of the present invention.

The invention allows automatic address allocation and configuration between the main processor and the adapter. FIG. 3 shows the principle of the invention. Master processor 304 of the base system communicates with interface cards 310, 320 and 330 through data bus 305, address bus 306 and control bus 307 (shown in FIG. 4). Interface card 310 includes processor 311 and two registers 312 and 313. Interface card 320 includes processor 321 and two registers 322 and 323. Similarly interface card 330 includes processor 331 and two registers 332 and 333. Obviously, the number of cards is not limited to three and may be increased according to the requirements of the user simply by plugging an extra card in one of the available slots. In the memory space, a specific area is reserved for adapters. Let's suppose that all our adapters have a specific area call 'AA' (typically, 'AA' size may be about one kilobyte). The reader should have noticed the symmetrical aspect of the architecture, and until now no adapter card (even with different identification or function) can be discriminated by an address since they do not have their specific address yet. An initialization sequence will start and give the master processor the capability to address each adapter card one at a time and if needed, reassign to them specific addresses if required by the application programs. The initialization sequence begins with an initialization command, which may be the transmission on address bus 306 of an initialization address common to any adapter and to which each one answers by performing the initialization sequence. During this sequence, all adapters 310, 320 and 330 compute a random address within the area 'AA'. This random address can be computed either by a processor on the card or by the hardware itself if the card does not have a processor. For instance, the address WXYZ chosen by the adapter 310 will become its own address stored in register 312 and will be used to decode address bus 306. Similarly, adapter 320 (respectively 330) will store address W'X'Y'Z' (respectively W"X"Y"Z") in register 322 (respectively 332).

Then, master processor 304 scans all possible addresses in the area 'AA'. When an address that has not been chosen by the adapter cards is scanned, no adapter answers and therefore, nothing is read by the master processor 304. (If the data bus is tri-state, FFFF is read). When the scanning passes on the address WXYZ chosen by adapter card 310, that value is sent back by the adapter as an answer of the read instruction of master processor 304. It should be noticed that any other signals to indicate the presence of the adapter may be used, such as card present, card I/O, and so forth.

At the end of the scanning on all the area 'AA', the master processor normally gets as many answers as the number of cards plugged. In the unlikely case where two or more adapters have chosen the same random address, the number of answers received will be less than the number of adapters in its configuration since the adapters with the same address will answer simultaneously. The master processor 304 will restart the procedure by writing the initialization command into all adapters again. That procedure will go on until each adapter card has a different random address. The method by which master processor 304 knows how many adapter cards are attached so that it can determine whether two or more adapters have chosen the same random address depends on the technical environment of the system, the nature of the master processor and so forth. In one method, one signal "card present" is wired on the board for each adapter and the master processor counts the number of times the signal is present. That number stands for the total number of interface cards plugged in the machine. In a second method, the master processor performs the initialization sequence N times. The number of cards plugged in the machine is the biggest number determined in the N times. In a third method, the interface card which recognizes its address does not write the address on the data bus, but rather a word with only one "0" (ground) level. The interface card affects the position of that "0" level randomly. Therefore, two "0's" on the data bus will mean that two adapters have chosen the same address. In a fourth method, the correct number of interface cards is given to the master processor by means of some manual intervention, such as, rotary, keyboard, jumpers, and so forth.

When master processor 304 knows the specific address chosen by each adapter card, it has the capability of addressing each card separately. Particularly, the master processor 304 can read the identifier of the card to determine its type, such as SDLC card, floppy disk, interface card and so forth. The master processor can also reassign new addresses (if required) for each adapter according to the application program requirements. These new addresses are stored in registers 313, 323 and 333. This may end with the creation of a configuration table.

Figure 4:
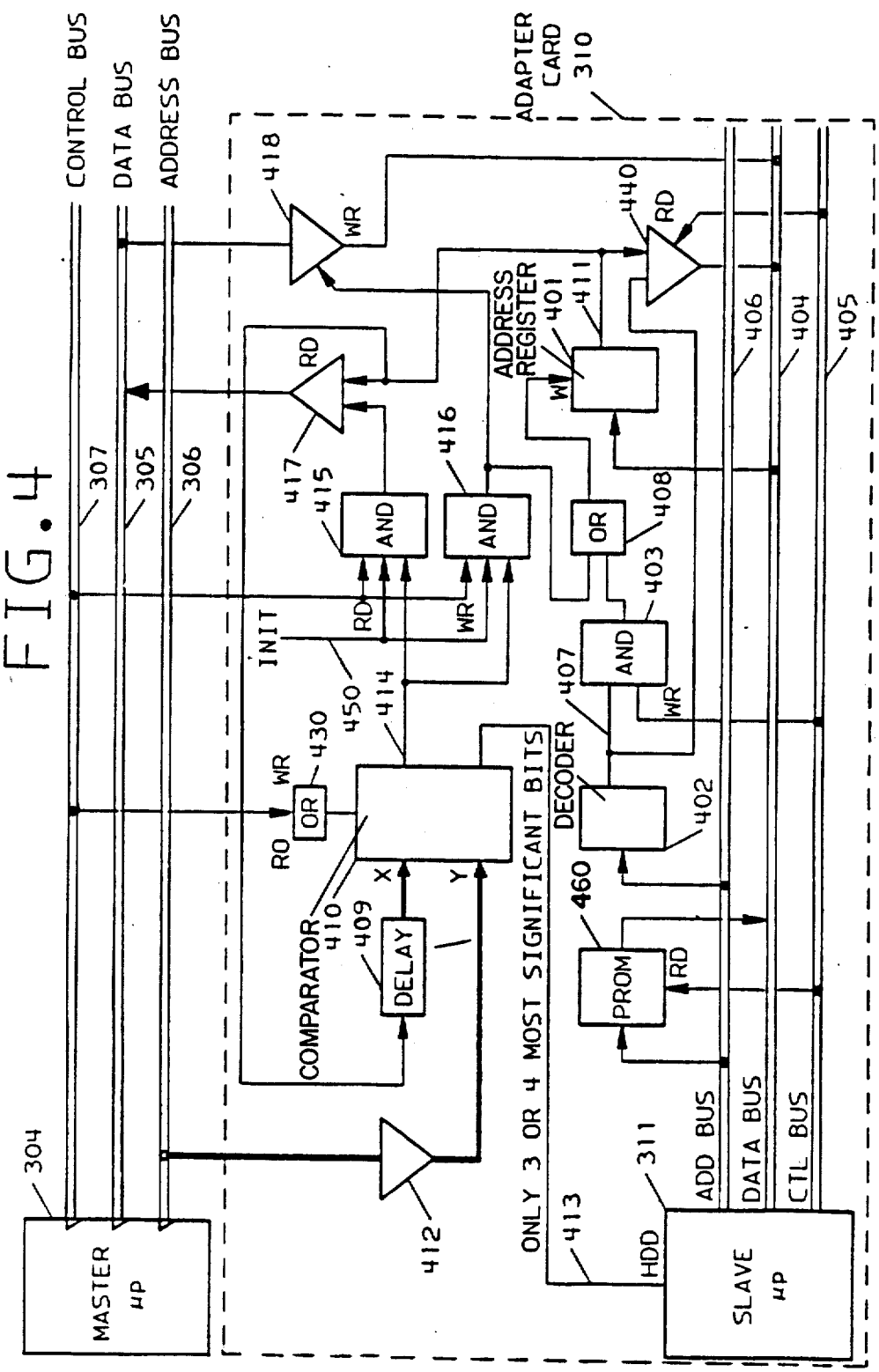
FIG. 4 is a schematic block diagram of the preferred embodiment of the present invention.

FIG. 4 describes with more detail the preferred embodiment of the invention. As previously, master processor 304 communicates with interface card 310 through address bus 306, data bus 305 and control bus 307. The latter bus generates the write and read pulses. Interface card 310 includes slave processor 311 communicating through address bus 406, data bus 404 and control bus 405. Control lead 413 enables those buses to be frozen (high impedance value). PROM 460 stores the processor control program for the sequencing of all the operations described further and particularly for the initialization sequence. In this particular embodiment, registers 312 and 313 have been reduced to register 401, and therefore if the reassignment process is performed, the new address will supersede the previous one which has been chosen by processor 311.

At the beginning of the initialization sequence, slave processor 311 computes a random address WXYZ for instance. Then the value of the random address WXYZ is transmitted over bus 404 while bus 406 carries the address of address register 401. That address is decoded by decoder 402 which enables control lead 407 thereby causing the write pulse coming from control bus 405 to pass through AND gate 403. The write pulse is transmitted to OR gate 408 connected to the write input (WR) of address register 401. The value of WXYZ carried by data bus 404 is eventually stored into address register 401. At this step, address register 401 can be read by slave processor 311, if necessary for checking purposes, through gate 440 with a read command on control bus 405. The value WXYZ is automatically sent to comparator circuit 410. The output from register 401 is entered into delay circuit 409 by lead 411 and then transmitted to the X input of comparator 410 after a delay time. OR gate 430 controls the validation of the comparison in comparator 410 when a 'READ' or 'WRITE' occurs on control bus 307. The address of this specific adapter 310 for master processor 304 is WXYZ by now. In summary, it can be noticed that the specific address register 401 is accessible through two different addresses. It can be addressed by slave processor 311 by means of a predetermined fixed address through decoder 402. It can also be addressed by main processor 304 by means of the random address WXYZ computed by slave processor 311 through comparator 410.

At the end of the first step of the initialization, each adapter has computed its own random address. Then, master processor 304 scans all possible addresses within the allocated area 'AA' with a succession of read commands. When the value WXYZ is transmitted over address bus 306, it is sent immediately through driver 412 to comparator 410. Since the values of the two inputs X and Y of comparator 410 are equal, control leads 413 and 414 are enabled. Control lead 413 when enabled permits buses 404, 405, 406 to be frozen.

Control lead 414 permits the read pulse coming from master processor 304 through control bus 307 to be transmitted through AND gate 415. The output of gate 415 enables driver 417 to transmit the output of register 401 to data bus 305. Thus, master processor 304 can read the random address of the adapter WXYZ on its data bus 305 as an answer to the read command telling the master processor that the address has been chosen by at least one adapter. Master processor 304 knows the number and the values of the addresses chosen by all the adapters. If it happens that two or more adapters have chosen the same address, the number of the answers is lower than the number of cards plugged. In this case, a new initialization sequence will be performed in order to get a different address for each adapter.

At the end of that initialization sequence, master processor 304 knows the random addresses chosen and therefore can address each adapter separately. Depending on the requirements of the customer or the program application, it may be necessary to reassign a new address to each interface card. The reassignment of the cards will allow the application program to address the interface cards independently of the prior random addresses chosen in the initialization sequence.

To reassign an address to an adapter, master processor 304 writes this new address into address register 401 as discussed below. During a period master processor 304 addresses interface card 310 with random address WXYZ carried on address bus 306. Since the values X and Y of comparator 410 are equal, leads 413 and 414 are enabled. Control lead 413 freezes buses 404, 405 and 406. Control lead 414 enables AND gates 415 and 416. INIT lead 450 is controlled by master processor 304 or by internal hardware and is connected to AND gates 415 and 416. It will be used to lock register 401 when the initialization sequence is performed.

During a second period, master processor 304 transmits the new adapter address on data bus 305 and sends the write pulse on control bus 307. AND gate 416 is set ON and validates a bus receiver 418. Data bus 305 is dotted with slave data bus 404 which was at high impedance. AND gate 416 also validates OR gate 408 which causes the value of the new card address to be stored in address register 401. The value stored is then transmitted to the X input of comparator 410 through delay circuit 409. This delay is needed in order to ensure a pulse large enough on lead 414 and therefore on the output of OR gate 408. That delay circuit may be replaced by a logic multiplexer. As the values X and Y are now different, the comparison fails and gates 415, 416 and 418 go down. At the end of that reassignment sequence, the new address is stored into address register 401 and therefore can be used by master processor 304 to address the card as described above.

It should be noticed that, as usual, the adapter address consists of the most significant bits of the address, the least significant bits are used to select the different registers within the adapter.

The adapter may also have an identifier register specific to the type of adapter, such as, SDLC card, floppy disk interface card, printer cards, and so forth. By reading that register during the initialization sequence, master processor 304 has the capability to determine which type of adapter corresponds to a given random address and therefore to distribute a new addressing step according to the identifier register and the nature of the card. This is a way of creating an automatic configuration table and thus allowing the application program to address each card irrespective of the prior random addresses computed during the initialization sequence.

It should be noticed that usually all modules described in FIG. 4, except delay circuit 409 and address register 401, already exist on common interface cards and therefore the invention may be implemented on prospective cards without involving any significant extra cost.

We claim:

1. A data processing system comprising: a bus; a processor connected to said bus; and an interface card connected to said bus for communicating with said processor, said interface card comprising decoding means for computing a random address during an initialization sequence so that said interface card gets a unique address and for using said random address to decode an address on said bus so that said processor addresses said interface card.

2. A data processing system as recited in claim 1, wherein said decoding means comprises: means for selecting a random address within a specific memory area during an initialization sequence; means for storing said selected random address; means for comparing said selected random address with an address on said bus; and means responsive to said comparing means for performing the addressing of said interface card when an address on said bus compares with said selected random address.

3. A data processing system as recited in claim 2, wherein said processor transmits all possible addresses within said specific memory area on said bus; and said comparing means has a first input connected to said storing means and has a second input connected to said bus and detects when an address on said bus matches said selected random address stored in said storing means.

4. A data processing system as recited in claim 3, wherein said interface card further comprises means responsive to said comparing means to transmit a signal to said processor indicating that an address on said bus has been selected and can be used to address said interface card.

5. A data processing system as recited in claim 4, wherein said interface card further comprises means to identify the type of adapter that said interface card is and wherein said master processor, during said initialization sequence in response to said signal from said transmitting means, determines from said identifying means the type of adapter that responded to said selected random address.

6. A data processing system as recited in claim 5, wherein said interface card further comprises means responsive to said processor for reassigning a new address in said storing means according to the requirements of an application program during said initialization sequence.

7. A data processing system as recited in claim 4, wherein said processor repeats said initialization sequence if said processor determines that the number of signals received from said transmitting means is less than the number of interface cards in said data processing system.

8. A data processing system as recited in claim 4, wherein said processor repeats said initialization sequence if said processor determines from said transmitted signal that more than one interface card in said data processing system has chosen identical selected random addresses.

9. A data processing system as recited in claim 7, wherein said interface card further comprises means to identify the type of adapter that said interface card is and wherein said processor, during said initialization sequence in response to said signal from said transmitting means, determines from said identifying means the type of adapter that responded to said selected random address.

10. A data processing system as recited in claim 8, wherein said interface card further comprises means to identify the type of adapter that said interface card is and wherein said processor, during said initialization sequence in response to said signal from said transmitting means, determines from said identifying means the type of adapter that responded to said selected random address.

11. A data processing system as recited in claim 9, wherein said interface card further comprises means responsive to said processor for reassigning a new address in said storing means according to the requirements of an application program during said initialization sequence.

12. A data processing system as recited in claim 10, wherein said interface card further comprises means responsive to said processor for reassigning a new address in said storing means according to the requirements of an application program during said initialization sequence.

13. An interface card for use in a data processing system comprising a bus and a processor connected to said bus, said interface card comprising: means for connecting to said bus; and decoding means for computing a random address during an initialization sequence so that said interface card gets a unique address and for using said random address to decode an address on said bus so that said processor addresses said interface card.

14. An interface card as recited in claim 13, wherein said decoding means comprises: means for selecting a random address within a specific memory area during an initialization sequence; means for storing said selected random address; means for comparing said selected random address with an address on said bus; and means responsive to said comparing means for performing the addressing of said interface card when an address on said bus compares with said selected random address.

15. An interface card as recited in claim 14, wherein said comparing means has a first input connected to said storing means and has a second input connected to said connecting means and detects when an address on said bus matches said selected random address stored in said storing means.

16. An interface card as recited in claim 15, further comprising means responsive to said comparing means to transmit a signal to said connecting means indicating that an address on said bus has been selected and can be used to address said interface card.

17. An interface card as recited in claim 16, further comprising means to identify the type of adapter that said interface card is, said identifying means being connected to said connecting means.

18. An interface card as recited in claim 17, further comprising means responsive to said processor for reassigning a new address in said storing means according to the requirements of an application program during said initialization sequence.

* * * * *